Patented July 10, 1923.

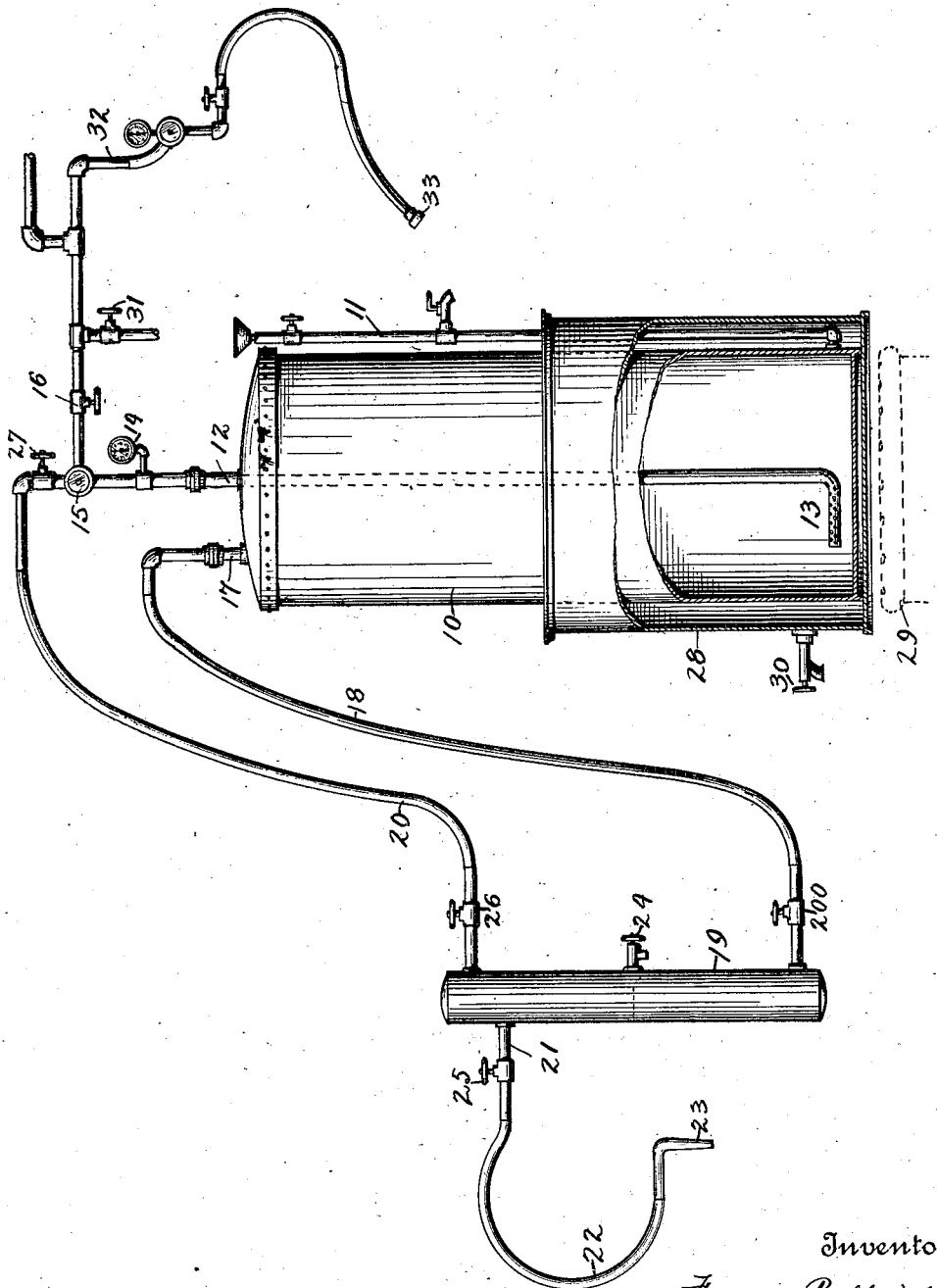

1,461,377

UNITED STATES PATENT OFFICE.

FRANK BELLVILLE, EDWIN A. BELLEVILLE, AND ROBERT S. HENDERSON, OF TWIN FALLS, IDAHO.

GAS APPARATUS.

Application filed April 9, 1920. Serial No. 372,569.

*To all whom it may concern:*

Be it known that we, FRANK BELLVILLE, EDWIN A. BELLEVILLE, and ROBERT S. HENDERSON, all citizens of the United States, residing at Twin Falls, in the county of Twin Falls and State of Idaho, have invented certain new and useful Improvements in Gas Apparatus, of which the following is a specification, reference being had therein to the accompanying drawing.

Our invention has, as its general object, the provision of apparatus for the generation of heat for localized use, as in brazing or welding, which will possess among other advantages, safety from flareback, ready regulation of the form or size of flame, facility and quickness of manipulation, high efficiency, and with this object in view, our invention consists in apparatus having the construction defined by or embraced within the scope of the appended claim.

In the annexed drawings, the Figure is a view in side elevation of apparatus that embodies our invention, certain parts being broken away for clearness of illustration.

We employ a closed, pressure-resisting tank 10 in the form of a vertical cylinder that is supplied with the desired gas-supplying material, preferably a mixture of gasoline, camphor gum and ether, which is supplied to the tank through a vertical, valved filling pipe 11, that enters the tank near its bottom. Air under pressure is supplied to said tank through a vertical pipe 12 which enters the top thereof and which terminates near the bottom in a perforated elbow 13. The pipe 12 may be connected to a tank or holder of compressed air. It preferably is provided with a pressure gauge 14, and beyond the latter, it has a reducing valve 15, and beyond the latter is a hand operated needle valve 16 to control and regulate the air flow to the tank.

In its top, the tank 10 has an outlet pipe 17 for the mixed gas and air, and from said pipe a flexible tube or hose 18 extends to one end of a small tank or chamber 19, while to the other end, a flexible tube or hose 20 extends from the air pipe 12 beyond the reducing valve 15, so as to take air from the source of supply and deliver it directly to the tank 19. The small or supplemental tank 19 has an outlet pipe 21 that is connected by a flexible tube or hose 22 to a blow pipe 23 at the extremity of which the issuing mixture is ignited and by which the flame is applied to the desired point. The supplemental tank 19 serves as a mixing tank, as a safety device to prevent back firing to the main tank, and as a receptacle for liquid of condensation. It has a draw-off cock 24. The outlet pipe 21 has a needle valve 25, and close to the supplemental tank 19, the air and gas pipe 17 has a needle valve 200, and the pipe 20 has a needle valve 26, and it also has a needle valve 27 close to the reducing valve 15. The tank 19 may have a pet-cock.

Preferably the gas producing contents of tank 10 are heated to promote the vaporization thereof, and for this purpose we place the lower part of the tank in a jacket 28 containing water, which is heated by a stove or heater 29, which may be of any desired kind. The jacket is provided with a draw-off cock 30.

Our apparatus is especially useful in such work as the repair of automobile radiators, because the blow pipe can be readily applied at points inaccessible to soldering irons, the flame can be reduced to a point, or expanded to a brush, merely by manipulation of the proper needle valves, and the supplemental tank 19 constituting both a second mixing chamber and a safety device, adds to the efficiency and promotes safety of use of the apparatus. It is economical of material, and enables repair work to be done most rapidly.

Since our invention is especially fitted for automobile repair work, we add to the air supply pipe a valve controlled branch 31 that operates a paint machine to paint radiators and a branch 32 having a reducing valve, a pressure gauge, and a needle valve, and a flexible hose which terminates in a rubber cap 33 to fit the overflow pipe of a radiator.

What we claim is:—

In apparatus of the class described, the combination of a generating tank, a chamber, a pipe leading from said tank to the chamber to convey the contents of the tank directly to the chamber, a pipe for supplying air under pressure to the tank, a branch leading directly from said pipe to said chamber, and a blowpipe connected with said chamber for receiving therefrom the contents delivered to it by said two pipes.

In testimony whereof we hereunto affix our signatures.

FRANK BELLVILLE.
EDWIN A. BELLEVILLE.
ROBERT S. HENDERSON.